United States Patent Office 3,812,105
Patented May 21, 1974

3,812,105
19-NOR-PROGESTERONE DERIVATIVES
Arthur F. Marx and Hermanus J. Kooreman, Delft, Netherlands, assignors to Koninklijke Nederlandsche Gist-En Spiritusfabriek N.V., Delft, Netherlands
No Drawing. Continuation of abandoned application Ser. No. 856,475, Sept. 9, 1969. This application Apr. 21, 1972, Ser. No. 246,215
Claims priority, application Great Britain, Sept. 11, 1968, 43,295/68
Int. Cl. C07c *169/34*
U.S. Cl. 260—239.55 C    17 Claims

ABSTRACT OF THE DISCLOSURE

New 14α,17α-alkylidenedioxy- and 14α,17α-benzylidenedioxy-19-nor-progesterone compounds are disclosed. The new compounds possess progestational activity.

---

This is a continuation of application Ser. No. 856,475, filed Sept. 9, 1969, now abandoned.

BACKGROUND OF THE INVENTION

This invention relates to new therapeutically useful steroids of the 19-nor-progesterone series, to processes for their preparation and to pharmaceutical compositions containing them.

SUMMARY OF THE INVENTION

New steroids have been discovered which are 14α,17α-methylenedioxy-19-nor-progesterone derivatives of the formula

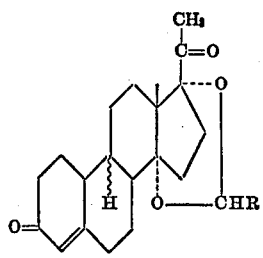

(1)

in which R represents a straight or branched chain aliphatic hydrocarbon group having less than 6 carbon atoms or a phenyl group.

It has been found that 19-nor-pregesterone derivatives of formula 1 are therapeutically useful compounds which possess progestational activity. Some of the compounds are particularly useful in the treatment of threatened abortus, of dysmenorrhoea or for healing the mucous membrane of the uterus. Moreover, many of these compounds have excellent contraceptive properties. These compounds give, in many cases, a remarkably long-lasting protection against conception. Therefore, they may be applied as long-acting contraceptives, preferably in combination with an oestrogenic compound.

DESCRIPTION OF PREFERRED EMBODIMENTS

The 14α,17α-methylenedioxy - 19 - nor - progesterone derivatives of formula 1 may be prepared by methods known *per se* for the preparation of analogous compounds. By the term "methods known *per se*" is meant methods heretofore used or described in the chemical literature.

According to a feature of the invention the 19-nor-progesterone derivatives of formula 1 are prepared by reacting 3,14α,17α-trihydroxy - 19 - nor-1,3,5(10)-pregnatriene-20-one, or its 9β-isomer, with an aldehyde of the formula RCHO, wherein R is as hereinbefore defined.

The thus obtained 14α,17α-methylenedioxy derivative of the formula

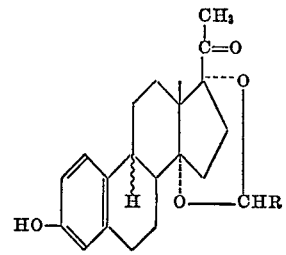

(2)

wherein R is as hereinbefore defined, is then converted to the corresponding 19-nor-progesterone derivative in a manner known *per se*.

Preferably the reaction of 3,14α,17α-trihydroxy-19-nor-1,3,5(10)-pregnatriene-20-one with an aldehyde of the formula RCHO is carried out at room temperature in the presence of a strong acid as catalyst and, if desired, in an inert organic medium. Preferred catalysts are perchloric acid, p-toluenesulphonic acid, sulphuric acid and hydrochloric acid. Suitable solvents include for example halogenated alkanes, methyl acetate, ethyl acetate, dioxane, tetrahydrofuran, benzene and dimethylformamide.

The conversion of a 14α,17α-methylenedioxy derivative of formula 2 to the corresponding 19-nor-progesterone derivative of formula 1 is preferably carried out in four succeeding reaction steps.

(a) Protection of the 3-hydroxyl group by etherification; for example, a compound of formula 2 may be reacted with a dialkyl sulphate, such as dimethyl sulphate, thereby obtaining a 3-alkoxy derivative of formula

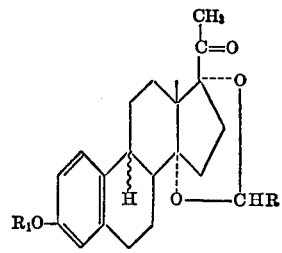

(3)

wherein $R_1$ represents a lower alkyl group having less than 3 carbon atoms and R is as hereinbefore defined. The reaction is preferably carried out in the presence of an aqueous alkali hydroxide solution and an inert organic solvent medium, such as benzene, at room temperature.

(b) Protection of the 20-keto group; for example, this group can be protected by converting it with ethylene glycol to a 20,20-ethylenedioxy group. Preferably the reaction is carried out by refluxing a compound of formula 3, dissolved in a suitable organic medium, such as benzene, with ethylene glycol in the presence of a strong acid, such as p-toluenesulphonic acid, thereby obtaining a 20,20-ethylenedioxy compound of formula

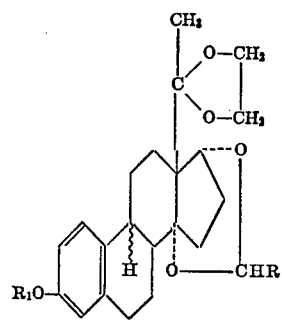

(4)

wherein R and $R_1$ are as hereinbefore defined.

(c) Reduction to 2,5(10)-pregnadiene derivative; the reduction is preferably carried out by reacting a compound of formula 4, dissolved in a suitable organic medium, such as tetrahydrofuran, with sodium and liquid ammonia, thereby obtaining a 2,5(10)-pregnadiene derivative of formula

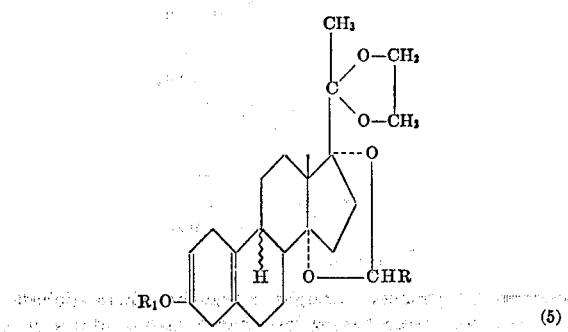

wherein R and R₁ are as hereinbefore defined. When this reduction is carried out with the compound of formula 4, wherein R represents a phenyl group, the 14α,17α-methylenedioxy group is split off simultaneously and there is obtained 3-methoxy-20,20-ethylenedioxy-14α,17α-dihydroxy-19-nor-2,5(10)-pregnadiene, which has to be converted again to the desired corresponding 14α,17α-benzylidenedioxy derivative. This can be effected by reacting the 14α,17α-dihydroxy compound with benzaldehyde under the same reaction conditions as described above.

(d) Preparation of 19-nor-progesterone derivative; a compound of formula 1 is obtained by refluxing a solution of a compound of formula 5 in a suitable organic solvent, such as methanol, in the presence of a strong acid, such as hydrochloric acid.

All the compounds of formulas 2, 3, 4 and 5 are new and particularly useful in the preparation of compounds of formula 1; as such they form a feature of the invention.

The starting material in the above described procedure, 3,14α,17α-trihydroxy-19-nor-1,3,5(10)-pregnatriene-20-one, is also a new compound. It is prepared in a sequence of five reaction steps from the known compound 14α,17α-dihydroxyprogesterone.

(a) First, 14α,17α-dihydroxyprogesterone is microbiologically hydroxylated in the 11-position, for example with *Cunninghamella blakesleeana*, *Curvularia lunata*, or with *Aspergillus ochraceus*, thus obtaining 11,14α,17α-trihydroxylprogesterone.

(b) This compound may then be dehydrated to give the corresponding 9(11)-dehydro derivative; for example, 11α,14α,17α-trihydroxyprogesterone can be acylated, for example with methane sulphonyl chloride to 11α,14α,17α-trihydroxyprogesterone 11-methane sulphonate. The acyl derivative, dissolved in a suitable organic solvent, such as dimethylformamide, is then heated with lithium chloride to give 14α,17α-dihydroxy-9(11)-dihydroprogesterone. The 11β-isomer, 11β,14α,17α-trihydroxyprogesterone is converted with N-bromo-acetamide to the corresponding 9(11)-dehydro derivative. Preferably this reaction is carried out at room temperature in a suitable organic medium, such as pyridine.

(c) This compound is dehydrogenated in the 1,2-position, for example with selenium oxide or 2,3-dichloro-4,5-dicyanobenzoquinone, or by fermentation with a suitable microorganism, such as *Corynebacterium simplex*, to give 14α,17α-dihydroxy-1,9(11)-bisdehydroprogesterone, which can also be indicated as 14α,17α-dihydroxy-1,4,9(11)-pregnatriene-3,20-dione.

(d) The compound thus obtained is then subjected to an aromatization reaction; this may be carried out, for example, by heating the compound in pyridine with zinc dust to give 3,14α,17α-trihydroxy-19-nor-1,3,5(10),9(11)-pregnatetraene-20-one.

(e) The 9(11)-double bond is then reduced again, for example catalytically, using platinum oxide as catalyst. There is obtained a mixture of the 9α- and the 9β-isomer, 3,14α,17α-trihydroxy-19-nor-1,3,5(10)-pregnatriene-20-one and 3,14α,17α-trihydroxy-19-nor-9β-1,3,5(10)-pregnatriene-20-one respectively, the hydrogen atom in the 9α-position not being indicated as is conventional, which isomers can be separated by crystallization or column chromatography.

Each of these isomers is then reacted further with an aldehyde of the formula RCHO, as is described above, to give respectively the 9α- or the 9β-isomer of a 19-nor-progesterone compound of formula 1.

All the compounds obtained according to the above described processes, except 11β,14α,17α-trihydroxyprogesterone, are new.

According to another feature of the invention the 14α,17α-methylenedioxy derivatives of formula 3, which are intermediates in the process of preparing the compounds of formula 1, are prepared by first converting 14α,17α-dihydroxyprogesterone to a 14α,17α-methylenedioxy derivative of the formula

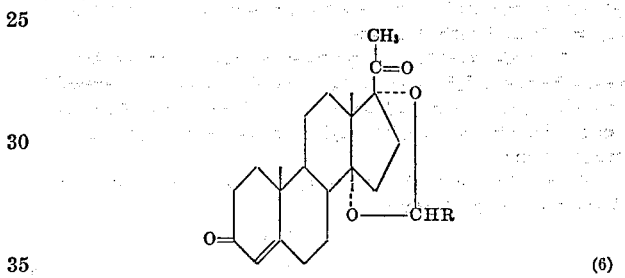

wherein R is as hereinbefore defined, and then converting the compound thus obtained to a 3-alkoxy-19-nor-1,3,5(10)-pregnatriene derivative of formula 3.

The various reactions used to carry out this process are quite similar to those described hereinbefore. The introduction of a substituted 14α,17α-methylenedioxy group, of a hydroxyl group in 11-position and of the 1,2- and 9(11)-double bonds and the conversion of the 3-hydroxy- to a 3-alkoxy-group, as well as the aromatization reaction, can all be carried out as hereinbefore described.

However, upon reduction of the 9(11)-double bond, a mixture of the 9α- and the 9β-isomer is not obtained as was the case in the above described process; only one of the two possible isomers is formed, the nature of the isomer depending on the way in which the reduction is carried out, as will be explained herebelow.

Using the process hereinbefore described 14α,17α-dihydroxyprogesterone may be converted to a 14α,17α-methylenedioxy-1,9(11)-bisdehydroprogesterone of the formula

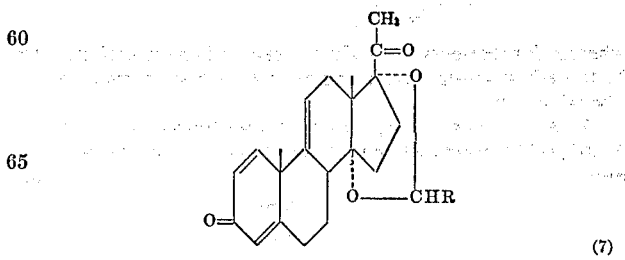

wherein R is as hereinbefore defined.

A compound of formula 7 is then subjected to an aromatization reaction and the 3-hydroxy group is converted to a 3-alkoxy group, using the processes hereinbefore described, to give a 3-alkoxy-14α,17α-methylenedioxy-19-nor-1,3,5(10),9(11)-pregnatetraene - 20 - one of the formula

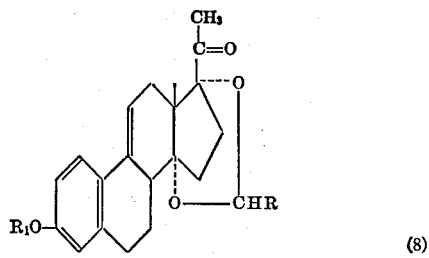

wherein R and R₁ are as hereinbefore defined.

The reduction of the 9(11)-double bond in a compound of the formula 8 may be carried out catalytically, using for instance platinum oxide as a catalyst. The 9β-isomer of a compound of formula 3, is then obtained exclusively, which may be converted in the manner hereinbefore described to the 9β-isomer of a compound of formula 1.

However, when the reduction of the 9(11)-double bond in a compound of formula 8 is carried out with lithium in liquid ammonia, the 9α-isomer of a compound of formula 3 is obtained exclusively.

Preferably, the 20-keto group in a compound of formula 8, is protected, for example by converting it to the 20,20-ethylenedioxy group, before the reduction with lithium and liquid ammonia is carried out. The 20,20-ethylenedioxy group can be introduced in the manner described hereinbefore.

After reduction of the 9(11)-double bond there is obtained a compound of formula 4, which can be used directly in the process of preparing a compound of formula 1, which is then obtained in the form of a 9α-isomer.

According to still another feature of the invention a compound of formula 4, wherein R is as hereinbefore defined and R₁ represents a hydrogen atom, which is an intermediate in the process of preparing a compound of the formula 1, is prepared without the intermediate introduction of a double bond in the 9,11-position.

In this process, 14α,17α-dihydroxyprogesterone is first converted to a 14α,17α-methylenedioxy-20,20ethylenedioxy-1,4-pregnadiene-3-one derivative of formula

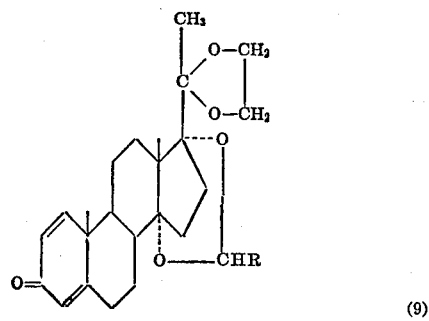

wherein R is as hereinbefore defined, using the processes hereinbefore described.

Aromatization of a compound of formula 9 is carried out by reaction with lithium, thereby obtaining a compound of formula 4, wherein R is as hereinbefore defined and R₁ represents a hydrogen atom. The reaction is preferably carried out by refluxing the reactants in a suitable organic solvent medium, such as tetrahydrofuran, and in a nitrogen atmosphere.

The 3-hydroxy-14α,17α-methylenedioxy-20,20-ethylenedioxy 19-nor-1,3,5(10)-pregnatriene derivative thus obtained is used directly to prepare a compound of formula 1, using the processes hereinbefore described.

The compounds of formula 6 are disclosed in our co-pending U.S. patent application Ser. No. 712,600, now U.S. Pat. No. 3,560,486, which application is incorporated herein by reference. The compounds of formulas 7, 8 and 9 are also new compounds particularly useful in a preferred to procedure to prepare compounds of formula 1 and as such form a feature of the invention.

Example I (a) Nutrient medium in an amount of 5.5 l. consisting of 0.5% of glucose and 0.5% of corn steep liquor were inoculated with 275 ml. of shake culture of *Aspergillus ochraceus*. The microorganism was grown at 26° C. with vigorous stirring and aeration. After 24 hours a solution of 1.4 g. of 14α,17α-dihydroxy-progesterone in 20 ml. of dimethylformamide was added. After 72 hours, the conversion being complete, the culture broth was filtered and the filtrate extracted three times with 1 l. of methyl isobutyl ketone. The extract was concentrated under reduced pressure and the residue crystallized from methanol; yield: 0.4 g. of 11α,14α,17α-trihydroxyprogesterone.

Melting point: 232–234.5° C.
I.R. (in $CHCl_3$): $\gamma_{max}$=3608, 3485, 1711, 1665, 1612 and 1350 cm.$^{-1}$.

(b) To a stirred suspension of 5 g. of 11α,14α,17α-trihydroxyprogesterone in 50 ml. of pyridine, 1.2 ml. of methane sulphonylchloride was added dropwise. The reaction mixture was kept at room temperature for 90 minutes and then poured into 750 ml. of water, thereby obtaining 5.6 g. of 11α,14α,17α-trihydroxyprogesterone 11-methane sulphonate.

Melting point: 160–161° C.
I.R. (in $CHCl_3$): $\gamma_{max}$=3600, 3505, 1709, 1665, 1610, 1350, 1333, 1170, 921 and 900 cm.$^{-1}$.

(c) A solution of 5.5 g. of 11α,14α,17α-trihydroxyprogesterone 11-methane sulphonate and 5.5 g. of lithium chloride in 55 ml. of dimethylformamide was kept at 100° C. for 30 minutes. To the cooled reaction mixture 20 ml. of water were added, yielding 3.5 g. of 14α,17α-dihydroxy-9(11)-dehydroprogesterone.

Melting point: 235–241° C.
N.M.R. (in $CDCl_3$+some DMSO-$d_6$): δ=0.58, 1.34, 2.15, about 4.0, 5.58 and 5.68 p.p.m.
Molecular ion peak in mass spectrum: Calculated for $C_{21}H_{28}O_4$: 344; found: 344.

(d) A mixture of 10 g. of 14α,17α-dihydroxy-9(11)-dehydroprogesterone, 6.6 g. of selenium oxide, 2 ml. of pyridine and 500 ml. of tert. butanol was refluxed for 17 hours. The precipitated selenium was filtered off, the filtrate diluted with 2.5 l. of methyl isobutyl ketone and washed with N sodium hydroxide solution, 0.5 N sulfuric acid and water. The organic fraction was concentrated and the brown, crystalline residue triturated with 50 ml. of methanol yielding 2.0 g. of nearly white 14α,17α-dihydroxy-1,9(11)-bisdehydroprogesterone.

Melting point 268–272° C.
I.R. (in $CHCl_3$): $\gamma_{max}$=3605, 3560, 3475, 1710, 1662, 1622, 1603 and 1350 cm.$^{-1}$.

(e) A mixture of 1.0 g. of 14α,17α-dihydroxy-1,9(11)-bisdehydroprogesterone, 30 ml. of pyridine containing 0.5 ml. of water, and 20 g. of zinc dust was heated under reflux with stirring for 210 min. After cooling, the zinc was removed by filtration and washed with methyl isobutyl ketone. The filtrate was concentrated and the residue dissolved in 25 ml. of methyl isobutyl ketone and this solution was washed with N sulfuric acid and water. The solvent was evaporated in vacuo and the residue was crystallized from ethanol; yield 0.50 g. of 3,14α,17α-trihydroxy-19-nor-1,3,5(10),9(11)-pregnatetraene-20-one.

Melting point: 230–235° C.
N.M.R. (in a mixture of $CDCl_3$ and DMSO-$d_6$): δ=0.68, 2.23, 6.23 (broad), 6.55, 6.6 and 7.5 (AB spectrum) p.p.m.

(f) A solution of 0.40 g. of 3,14α,17α-trihydroxy-19-nor-1,3,5(10),9(11)-pregnatetraene-20-one in 15 ml. of a mixture (1:1) of methanol and methylene chloride was shaken with 10 mg. of platinum oxide for 3 hours in a hydrogen atmosphere. After removal of the catalyst by filtration and concentration of the filtrate there was obtained a residue which was purified by column chromatography (silicagel, eluent: a solution of 5% acetone in benzene); yield 120 mg. of an a-polar and 160 mg. of a polar compound. The a-polar compound proved to be 3,14α,17α-trihydroxy-19-nor-9β-1,3,5(10)-pregnatriene-20-one.

Melting point: 167–169° C.
N.M.R. (in a mixture of CDCl₃ and DMSO-d₆): $\delta$=0.83, 2.21, 6.67, 6.7 and 7.2 (AB-spectrum) p.p.m.

The polar compound proved to be 3,14α,17α-trihydroxy-19-nor-1,3,5(10)-pregnatriene-20-one (i.e. the 9α-isomer).

Melting point: 244–248° C.
N.M.R. (in a mixture of CDCl₃ and DMSO-d₆): $\delta$=0.72, 2.23, 6.53, 6.6 and 7.1 (AB-spectrum) p.p.m.

(g) A solution of 1.0 g. of 3,14α,17α-trihydroxy-19-nor-1,3,5(10)-pregnatriene-20-one in a mixture of 6 ml. of paraldehyde, 6 ml. of dioxane and 0.05 ml. of 70% perchloric acid was kept at room temperature for 15 minutes. On successive addition of 1.5 ml. of N sodium hydrogen carbonate and 30 ml. of water, 1.0 g. of 3-hydroxy-14α,17α-ethylidenedioxy-19-nor-1,3,5(10)-pregnatriene-20-one was precipitated.

Melting point: 200–201° C.
I.R. (in CHCl₃): $\gamma_{max}$=3605, 1708, 1608, 1580, 1492, 1398, 1349, 1130 and 1107 cm.$^{-1}$.

(h) A mixture of 5 g. of 3-hydroxy-14α,17α-ethylidenedioxy-19-nor-1,3,5(10)-pregnatriene-20-one, 100 ml. of chloroform, 100 ml. of a 30% aqueous potassium hydroxide solution and 20 ml. of dimethyl sulfate was stirred at room temperature for 45 minutes. The chloroform layer was separated, washed three times with water and evaporated to dryness. The residue was crystallized from methanol; yield: 4.2 g. of 3-methoxy-14α,17α-ethylidenedioxy-19-nor-1,3,5(10)-pregnatriene-20-one.

Melting point: 163–164° C.
I.R. (in CHCl₃): $\gamma_{max}$=2835, 1707, 1604, 1570, 1490, 1409, 1122 and 1062 cm.$^{-1}$.
1359, 1160, 1138 and 1112 cm.$^{-1}$.

(i) A solution of 5.0 g. of 3-methoxy-14α,17α-ethylidenedioxy-19-nor-1,3,5(10)-pregnatriene-20-one in 75 ml. of benzene was refluxed for 14 hours with 37 ml. of ethylene glycol and 300 mg. of p-toluene sulphonic acid. The water formed was removed by azeotropic distillation. The mixture was cooled, diluted with 370 ml. of benzene and washed with water, with aqueous sodium bicarbonate solution, and again with water. Evaporation of the solvent gave a residue, which was crystallized from acetone. Yield: 3.6 g. of 3-methoxy-14α,17α-ethylidenedioxy-20,20-ethylenedioxy-19-nor-1,3,5(10)-pregnatriene.

Melting point: 182–183.5° C.
I.R. (in CHCl₃): $\gamma_{max}$=2840, 1607, 1570, 1490, 1409, 1122 and 1062 cm.$^{-1}$.

(j) To a solution of 2.4 g. of sodium in a mixture of 250 ml. of dry, distilled liquid ammonia and 125 ml. of dry tetrahydrofurane, 3.6 g. of 3-methoxy-14α,17α-ethylidenedioxy - 20,20 - ethylenedioxy - 19 - nor-1,3,5(10)-pregnatriene in 125 ml. of tetrahydrofurane and 2.0 ml. of absolute ethanol, was added over a period of 1 hour. The reaction mixture was stirred for 30 minutes and then a mixture of 4.0 ml. of absolute ethanol and 15 ml. of tetrahydrofurane was added and the stirring continued for 15 minutes. Evaporation of the solvent yielded a residue which was dissolved in a mixture of methyl isobutyl ketone and water. The organic layer was washed with water, concentrated and the residue obtained, crystallized from acetone/water. Yield: 3.5 g. of 3-methoxy-14α,17α-ethylidenedioxy-20,20-ethylenedioxy - 19 - nor-2,5(10)-pregnadiene.

I.R. (in CHCl₃): $\gamma_{max}$=2836, 1694, 1668, 1605, 1572, 1493, 1400, 1118 and 1058 cm.$^{-1}$.
Molecular ion peak in mass spectrum: Calculated for C₂₅H₃₆O₅: 416; found: 416.

(k) A solution of 3.0 g. of 3-methoxy-14α,17α-ethylidenedioxy - 20,20 - ethylenedioxy-19-nor-2,5(10)-pregnadiene in a mixture of 140 ml. of methanol and 40 ml. of 6 N hydrochloric acid, was refluxed for 15 minutes. The cooled reaction mixture was neutralized by addition of 31 g. of sodium acetate in 50 ml. of water. After evaporation in vacuo of most of the methanol the residue was extracted with methyl isobutyl ketone, the extract concentrated to dryness and the remaining oil crystallized from methanol/water. Yield: 1.6 g. of 14α,17α-ethylidenedioxy-19-nor-progesterone.

Melting point: 152–155° C.
$\gamma_{max}$ (in methanol): 240 nm.;

$$E_{1\,cm.}^{1\%} = 487$$

I.R. (in CHCl₃): $\gamma_{max}$=1711, 1669, 1620, 1401 . . . 1350 and 1110 cm.$^{-1}$.
N.M.R. (in CDCl₃): $\delta$=0.86, 1.38 (doublet), 2.18, 5.20 (quadruplet) and 5.86 p.p.m.
Molecular ion peak in mass spectrum: Calculated for C₂₂H₃₀O₄: 358; found: 358.

Example II (a) According to the procedure described in Example I (g), 3,14α,17α-trihydroxy-19-nor-9β-1,3,5(10)-pregnatriene-20-one (prepared according to the procedure described in Example I (f)) was converted to 3-hydroxy-14α,17α-ethylidenedioxy - 19 - nor-9β-1,3,5(10)-pregnatriene-20-one.

Melting point: 177–180° C.
I.R. (in CHCl₃): $\gamma_{max}$=3605, 1708, 1610, 1586, 1490, 1395, 1347, 1130 and 1110 cm.$^{-1}$.

(b) According to the procedure described in Example I (h), 3-hydroxy-14α,17α-ethylidenedioxy-19-nor-9β-1,3,5(10)-pregnatriene-20-one was converted to 3-methoxy-14α,17α-ethylidenedioxy - 19 - nor - 9β - 1,3,5(10)-pregnatriene-20-one.

Melting point: 111–116° C.
I.R. (in CHCl₃): $\gamma_{max}$=2843, 1708, 1609, 1579, 1490, 1358 and 1115 cm.$^{-1}$.

(c) According to the procedure described in Example I (i), 3-methoxy-14α,17α-ethylidenedioxy-19-nor-9β-1,3,5(10)-pregnatriene-20-one was converted to 3-methoxy-14α,17α - ethylidenedioxy-20,20-ethylenedioxy-19-nor-9β-1,3,5(10)-pregnatriene.

Melting point: 70–76° C.
I.R. (in CHCl₃): $\gamma_{max}$=2848, 1611, 1582, 1495, 1400, 1370, 1154, 1135, 1120, 1080, 1060, 1010, 990 and 950 cm.$^{-1}$.

(d) According to the procedure described in Example I (j), 3-methoxy-14α,17α-ethylidenedioxy-20,20-ethylenedioxy-19-nor-9β-1,3,5(10)-pregnatriene was converted to 3 - methoxy-14α,17α-ethyidenedioxy-20,20-ethylenedioxy-19-nor-9β-2,5(10)-pregnadiene.

I.R. (in CHCl₂): $\gamma_{max}$=2835, 1695, 1668, 1398, 1118 and 1060 cm.$^{-1}$.
Molecular ion peak in mass spectrum: Calculated for C₂₅H₃₆O₅: 416; found: 416.

(e) According to the procedure described in Example I (k), 3-methoxy-14α,17α-ethylidenedioxy-20,20-ethylenedioxy-19-nor-9β-2,5(10)-pregnadiene was converted to 14α,17α-ethylidenedioxy-19-nor-9β,10-progesterone.

Melting point: 140–1140.5° C.
γ$_{max}$ (in methanol): 243 nm.;

$$E^{1\%}_{1cm.} = 488$$

I.R. (in CHCl$_3$): γ$_{max}$=1711, 1660, 1610, 1402, 1350, 1124 and 1115 cm.$^{-1}$.
N.M.R. (in CDCl$_3$): δ=0.86, 1.38 (doublet), 2.20, 5.22 (quadruplet) and 5.89 p.p.m.
Molecular ion peak in mass spectrum: Calculated for C$_{22}$H$_{30}$O$_4$: 358; found: 358.

Example III (a) According to the procedure described in Example I (g), 3,14α,17α-trihydroxy-19-nor-1,3,5(10-pregnatriene-20-one (prepared according to the procedure described in Example I (f)) was converted with hexanal to 3-hydroxy - 14α,17α - hexylidenedioxy - 19-nor-1,3,5(10)-pregnatriene-20-one, isolated as an oil.

I.R. (in CHCl$_3$): γ$_{max}$=3605, 1710, 1610, 1583, 1350 and 1109 cm.$^{-1}$.
Molecular ion peak in mass spectrum: Calculated for C$_{26}$H$_{36}$O$_4$: 412; found: 412.

(b) According to the procedure described in Example I (h), 3 - hydroxy - 14α,17α - hexylidenedioxy-19-nor-1,3,5(10)-pregnatriene-20-one was converted to 3-methoxy - 14α,17α - hexylidenedioxy - 19 - nor-1,3,5(10)-pregnatriene-20-one.

Melting point: 49–52° C.
N.M.R. (in CDCl$_3$): δ=0.82, 0.88 (triplet), 2.20, 3.78, 5.05 (triplet), 6.67, 6.7 and 7.25 (AB-spectrum) p.p.m.

(c) According to the procedure described in Example I (i), 3 - methoxy - 14α,17α - hexylidenedioxy-19-nor-1,3,5(10)-pregnatriene-20-one was converted to 3-methoxy - 14α,17α - hexylidenedioxy-20,20-ethylenedioxy-19-nor-1,3,5(10)-pregnatriene.

Melting point: 56–58° C.
I.R. (in CHCl$_3$): γ$_{max}$=1608, 1572, 1498, 1113 and 1040 cm.$^{-1}$.

(d) According to the procedure described in Example I (j), 3-methoxy-14α,17α-hexylidenedioxy-20,20-ethylenedioxy-19-nor-1,3,5(10)-pregnatriene was converted to 3-methoxy - 14α,17α - hexylidenedioxy - 20,20 - ethylenedioxy - 19 - nor - 2,5(10)-pregnadiene.

Melting point: 118–122° C.
I.R. (in CHCl$_3$): γ$_{max}$=2832, 1692, 1663, 1112 and 1045 cm.$^{-1}$.

(e) According to the procedure described in Example I (k), 3 - methoxy - 14α,17α - hexylidenedioxy-20,20-ethylenedioxy - 19 - nor - 2,5(10)-pregnadiene was converted to 14α,17α-hexylidenedioxy-19-nor-progesterone.

Melting point: 72–77° C.
λ$_{max}$ (in methanol): 240 nm.;

$$E^{1\%}_{1cm.} = 450$$

I.R. (in CHCl$_3$): γ$_{max}$= 1713, 1665, 1620, 1351, 1145 and 1110 cm.$^{-1}$.
N.M.R. (in CDCl$_3$): δ=0.86, 0.88 (triplet), 2.18, 4.99 (triplet) and 5.87 p.p.m.
Molecular ion peak in mass spectrum: Calculated for C$_{26}$H$_{38}$O$_4$: 414; found: 414.

Example IV (a) According to the procedure described in Example I(g), 3,14α,17α - trihydroxy-19-nor-1,3,5(10)-pregnatriene-20-ene (prepared according to the procedure described in Example I (f)) was converted with 2,2-dimethylpropanal to 3-hydroxy-14α,17α - (2,2 - dimethylpropylidenedioxy)-19-nor-1,3,5(10)-pregnatriene-20-one.

Melting point: 205.5–207° C.
I.R. (in CHCl$_3$): γ$_{max}$=3602, 1710, 1608, 1582, 1493, 1350 and 1098 cm.$^{-1}$.

(b) According to the procedure described in Example I (h), 3 - hydroxy - 14α,17α - (2,2-dimethylpropylidenedioxy)-19-nor-1,3,5(10) - pregnatriene - 20-one was converted to 3 - methoxy-14α,17α-(2,2-dimethylpropylidenedioxy)-19-nor-1,3,5(10)-pregnatriene-20-one.

Melting point: 102–103° C.
N.M.R. (in CDCl$_3$): δ=0.85, 1.00, 2.22, 3.80, 4.62, 6.75, 6.8 and 7.3 (AB-spectrum) p.p.m.

(c) According to the procedure described in Example I (i), 3 - methoxy - 14α,17α-(2,2-dimethylpropylidenedioxy) - 19 - nor-1,3,5(10)-pregnatriene-20-one was converted to 3 - methoxy-14α,17α-(2,2-dimethylpropylidenedioxy) - 20,20 - ethylenedioxy - 19 - nor - 1,3,5(10)-pregnatriene Melting point: 108–109.5° C.
I.R. (in CHCl$_3$): γ$_{max}$=1609, 1574, 1498, 1110 and 1053 cm.$^{-1}$.

(d) According to the procedure described in Example I (j), 3 - methoxy-14α,17α - (2,2-dimethylpropylidenedioxy) - 20,20 - ethylenedioxy - 19 - nor - 1,3,5(10)-pregnatriene was converted to 3-methoxy-14α,17α-(2,2-dimethylpropylidenedioxy) - 20,20 - ethylenedioxy - 19-nor-2,5(10)-pregnadiene.

Melting point: 138–140.5° C.
I.R. (in CHCl$_3$): γ$_{max}$=2830, 1692, 1662, 1109 and 1050 cm.$^{-1}$.

(e) According to the procedure described in Example I (k), 3 - methoxy - 14α,17α - (2,2-dimethylpropylidenedioxy) - 20,20 - ethylenedioxy - 19-nor-2,5(10)-pregnadiene was converted to 14α,17α-(2,2-dimethylpropylidenedioxy)-19-nor-progesterone.

Melting point: 134–134.5° C.
λ$_{max}$ (in methanol)=241 nm.;

$$E^{1\%}_{1cm.} = 440$$

I.R. (in CHCl$_3$): γ$_{max}$=1710, 1662, 1628, 1382, 1352, 1131, 1109, 1100, 1051, 1009, 990, 962 and 881 cm.$^{-1}$.
N.M.R. (in CDCl$_3$): δ=0.88, 0.98, 2.19, 4.56 and 5.87 p.p.m.
Molecular ion peak in mass spectrum: Calculated for C$_{25}$H$_{36}$O$_4$: 400; found: 400.

Example V (a) According to the procedure described in Example I (g), 3,14α,17α - trihydroxy-19-nor-1,3,5(10)-pregnatriene-20-one (prepared according to the process described in Example I (f)) was converted with 2-ethylbutanal to 3 - hydroxy - 14α,17α - (2-ethylbutylidenedioxy)-19-nor-1,3,5(10)-pregnatriene-20-one, isolated as an oil.

I.R. (in CHCl$_3$): γ$_{max}$=3605, 1709, 1609, 1580, 1495, 1347 and 1093 cm.$^{-1}$.
Molecular ion peak in mass spectrum: Calculated for C$_{26}$H$_{36}$O$_4$: 412; found: 412.

(b) According to the procedure described in Example I (h), 3 - hydroxy - 14α,17α - (2-ethylbutylidenedioxy)-19-nor-1,3,5(10)-pregnatriene-20-one was converted to 3-methoxy - 14α,17α - (2 - ethylbutylidenedioxy)-19-nor-1,3,5(10)-pregnatriene-20-one.

Melting point: 86–87.5° C.
N.M.R. (in CDCl$_3$): δ=0.83, 0.93 (triplet), 2.20, 3.78, 5.95 (doublet), 6.67, 6.7 and 7.25 (AB-spectrum) p.p.m.

(c) According to the procedure described in Example I (i), 3 - methoxy - 14α,17α - (2-ethylbutylidenedioxy)-

19-nor-1,3,5(10)-pregnatriene-20-one was converted to 3-methoxy - 14α,17α - (2-ethylbutylidenedioxy)-20,20-ethylenedioxy-19-nor-1,3,5(10)-pregnatriene.

Melting point: 130–131° C.
I.R. (in CHCl₃): γmax=1608, 1572, 1496, 1158, 1138 and 110 cm.⁻¹.

(d) According to the procedure described in Example I (j), 3-methoxy-14α,17α-(2-ethylbutylidenedioxy)-20,20-ethylenedioxy-19-nor-1,3,5(10)-pregnatriene was converted to 3-methoxy-14α,17α-(2-ethylbutylidenedioxy)-20,20-ethylenedioxy-19-nor-2,5(10)-pregnadiene.

Melting point: 72.5–74° C.
I.R. (in CHCl₃): γmax=2835, 1695, 1667, 1110, 1100 and 1048 cm.⁻¹.

(e) According to the procedure described in Example I (k), 3-methoxy-14α,17α-(2-ethylbutylidenedioxy)-20,20-ethylenedioxy-19-nor-2,5(10)-pregnadiene was converted to 14α,17α-(2-ethylbutylidenedioxy)-19-nor-progesterone.

Melting point: 90–91.5° C.
λmax (in methanol)=241 nm.;

$$E_{1cm.}^{1\%}=470$$

I.R. (in CHCl₃): γmax=1710; 1662, 1618, 1350, 1170, 1115, 960 and 880 cm.⁻¹.
N.M.R. (in CDCl₃): δ=0.87, 0.92 (triplet), 2.17, 4.9 (doublet) and 5.87 p.p.m.
Molecular ion peak in mass spectrum: Calculated for $C_{26}H_{38}O_4$: 414; found: 414.

Example VI (a) According to the procedure described in Example I (g), 3,14α,17α-trihydroxy - 19 - nor-1,3,5(10)-pregnatriene-20-one (prepared according to the procedure of Example I (f), was converted with benzaldehyde to 3-hydroxy-14α,17α-benzylidenedioxy - 19 - nor-1,3,5(10)-pregnatriene-20-one.

Melting point: 184–186° C.
I.R. (in CHCl₃): γmax=3608, 1714, 1610, 1585, 1497, 1353 and 1090 cm.⁻¹.

(b) According to the procedure described in Example I (h), 3 - hydroxy-14α,17α-benzylidenedioxy-19-nor-1,3,5(10)-pregnatriene-20-one was converted to 3-methoxy-14α,17α - benzylidenedioxy - 19 - nor-1,3,5(10)-pregnatriene-20-one.

Melting point: 153–158° C.
N.M.R. (in CDCl₃): δ=0.88, 2.23, 3.77, 6.05, 6.68, 6.67 and 7.2 (AB-spectrum) and 7.3–7.7 (multiplet) p.p.m.

(e) According to the procedure described in Example I (i), 3-methoxy - 14α,17α - benzylidenedioxy-19-nor-1,3,5(10)-pregnatriene-20-one was converted to 3-methoxy-14α,17α-benzylidenedioxy-20,20-ethylenedioxy - 19 - nor-1,3,5(10)-pregnatriene.

Melting point: 124–128° C.
I.R. (in CHCl₃): γmax=1610, 1575, 1498, 1090, 1050 and 1042 cm.⁻¹.

(d) To a solution of 9.2 g. of sodium in a mixture of 350 ml. of dry, distilled liquid ammonia and 400 ml. of tetrahydrofurane, 10 g. of 3 - methoxy-14α,17α-benzylidenedioxy - 19 - nor-1,3,5(10)-pregnatriene in 175 ml. of tetrahydrofurane and 8 ml. of ethanol was added over a period of 1 hour. After stirring the reaction mixture for another hour, a mixture of 20 ml. of tetrahydrofurane and 16 ml. of ethanol was added and the stirring continued for 1 hour. Evaporation of the solvents yielded a residue which was dissolved in a mixture of tetrahydrofurane and water. Upon concentration of this solution there was obtained 7.6 g. of crystalline 3-methoxy-20,20-ethylenedioxy - 14α,17α - dihydroxy-19-nor-2,5(10)-pregnadiene.

Melting point: 193.5–199° C.
I.R. (in CHCl₃): γmax=3610, 3570, 3440, 2830, 1691, 1663, 1366, 1160, 1062, 1034, 981, 948, 890 and 880 cm.⁻¹.

(e) A suspension of 3.94 g. of 3-methoxy-20,20-ethylenedioxy - 14α,17α - dihydroxy-19-nor-2,5(10) - pregnadiene, 0.2 ml. of 70% perchloric acid, 10 ml. of benzaldehyde and 50 ml. of dioxane was kept at room temperature for 15 minutes. After addition of 0.4 ml. of pyridine the reaction mixture was concentrated and the residual oil dissolved in a mixture of 160 ml. of methanol and 50 ml. of 6 N hydrochloric acid. This solution was refluxed for 15 minutes; the cooled reaction mixture was treated with 48 g. of sodium acetate and 25 ml. of water and then concentrated. The concentrated solution was extracted with methyl isobutyl ketone and the extract was washed with a solution of sodium hydrogen carbonate in water and water. On evaporation of the solvent there was obtained 4.4 g. of a foamy residue which was chromatographed over a silica gel column; eluetion by benzene. Yield after crystallization from methanol/water: 0.2 g. of 14α,17α-benzylidenedioxy-19-nor-progesterone.

Melting point: 152.5–154° C.
λmax=(in methanol)=240 nm.;

$$E_{1cm.}^{1\%}=400$$

I.R. (in CHCl₃): γmax=1711, 1662, 1619, 1386, 1352, 1088, 1060, 1042, 1025, 990, 962, 940 and 883 cm.⁻¹.
N.M.R. (in CDCl₃): δ=0.94, 2.21, 5.85, 5.97 and 7.35–7.65 (multiplet) p.p.m.
Molecular ion peak in mass spectrum: Calculated for $C_{27}H_{32}O_4$: 420; found: 420.

Example VII (a) A suspension of 2.5 g. of 14α,17α-dihydroxyprogesterone in a mixture of 50 ml. of acetaldehyde and 0.25 ml. of 70% perchloric acid was stirred at room temperature; the steroid was completely dissolved within 1 hour. To the reaction mixture 150 ml. of methyl isobutyl ketone were added; the solution was neutralized with a solution of 1.5 g. of sodium bicarbonate in 30 ml. of water. This solution was washed with water and the solvent completely removed by distillation under reduced pressure. The residue was crystallized from acetone/water. Yield: 2.0 g. of 14α,17α-ethylidenedioxy progesterone.

Melting point: 178–181° C.
I.R. (in CHCl₃): γmax=1712, 1667, 1615, 1355 and 1113 cm.⁻¹.

(b) 10 l. of nutrient medium consisting of 0.5% of glucose and 0.5% of corn steep liquor were inoculated with 500 ml. of shake culture of *Curvularia lunata*. The micro-organism was grown at 26° C. with vigorous stirring and aeration. After 24 hours a solution of 3 g. of 14α17α-ethylidenedioxyprogesterone in 60 ml. of acetone was added. The conversion was complete after 72 hours. The mycelium was filtered off and washed with water. The filtrate and the washings were combined and extracted with methyl isobutyl ketone. The extract was evaporated to dryness under reduced pressure. The residue was crystallized from methyl isobutyl ketone. Yield: 0.9 g. of 11β-hydroxy-14α,17α-ethylidenedioxyprogesterone.

Melting point: 260.5–262° C. (after recrystallization from methyl isobutyl ketone).
I.R. (in CHCl₃): γmax=3612, 1712, 1665, 1620, 1359 and 1120 cm.⁻¹.

(c) A mixture of 10 g. of 11β-hydroxy-14α,17α-ethylidenedioxyprogesterone, 6.5 g. of 2,3 - dichloro-5,6-dicyanobenzoquinone and 250 ml. of benzene was stirred for 24 hours under anhydrous conditions at reflux temperature. The cooled reaction mixture was filtered and the filtrate stirred three times for 30 minutes with 15 g. of alumina. The benzene solution was concentrated and the residue triturated with diethyl ether. Yield: 6.5 g. of 11β-hydroxy - 14α,17α - ethylidenedioxy-1-dehydroprogesterone, slightly contaminated with the 6-dehydro isomer.

Melting point: 243–253° C.
I.R. (in CHCl$_3$): $\gamma_{max}$=3615, 1712, 1660, 1616, 1061, 1407, 1358 and 1112 cm.$^{-1}$.

(d) To a solution of 8.2 g. of 11β-hydroxy-14α,17α-ethylidenedioxy-1-dehydroprogesterone in a mixture of 55 ml. of tetrahydrofurane and 40 ml. of pyridine cooled at −10° C., 5.6 ml. of thionyl chloride was added at such a rate that the temperature did not rise above −5° C. The reaction mixture was kept at this temperature for 10 minutes, then warmed up to room temperature and poured to 1 l. of water. Yield: 6.4 g. of 14α,17α-ethylidenedioxy-1,9(11)-bisdehydroprogesterone.

Melting point: 177–181° C. (after crystallization from diethyl ether).
I.R. (in CHCl$_3$): $\gamma_{max}$=1710, 1668, 1662, 1623, 1603, 1352 and 1108 cm.$^{-1}$.

(e) According to the procedure described in Example I(e) 14α,17α-ethylidenedioxy - 1,9(11) - bisdehydroprogesterone was converted to 3-hydroxy-14α,17α-ethylidenedioxy-19-nor-1,3,5(10),9(11)-pregnatetraene-20-one.

Melting point: 198–202° C.
N.M.R. (in CDCl$_3$): δ=0.78, 1.34 (doublet), 2.22, 521 (quadruplet), 6.19, 6.60, 6.7 and 7.5 (AB-spectrum) p.p.m.

(f) According to the procedure described in Example I(h), 3-hydroxy-14α,17α-ethylenedioxy-19-nor-1,3,5(10),9(11)-pregnatetraene-20-one was converted to 3-methoxy-14α,17α-ethylenedioxy - 19 - nor - 1,3,5(10),9(11)-pregnatetraene-20-one.

Melting point: 153–157° C.
I.R. (in CHCl$_3$): $\gamma_{max}$=2843, 710, 1630, 1608, 1565, 1492, 1360 and 1140 cm.$^{-1}$.

(g) According to the procedure described in Example I(i), 3-methoxy-14α,17α-ethylenedioxy - 19 - nor-1,3,5(10),9(11)-pregnatetraene-20-one was converted to 3-methoxy-14α,17α-ethylenedioxy - 20,20 - ethylenedioxy-19-nor-1,3,5(10),9(11)-pregnatetraene.

Melting point: 220.5–222.5° C.
I.R. (in CHCl$_3$): $\gamma_{max}$=2843, 1633, 1608, 1568, 1493, 1120 and 1049 cm.$^{-1}$.

(h) To a solution of 1 g. of 3-methoxy-14α,17α-ethylidenedioxy-20,20-ethylendioxy - 19 - nor-1,3,5(10),9(11)-pregnatetraene in 250 ml. of anhydrous diethyl ether was added 250 ml. of freshly distilled liquid ammonia and the solution was treated with reflux with small pieces of lithium until a dark blue color persisted for 10 minutes. To the reaction mixture 5 g. of anhydrous ammonium chloride were added, the ammonia was allowed to evaporate and then water was added. The ethereal layer was separated and washed three times with water; the solvent was evaporated and the residue crystallized from acetone. Yield: 460 mg. of 3-methoxy-14α,17α-ethylidenedioxy-20,20-ethylenedioxy-19-nor-1,3,5(10) pregnatriene.

Melting point: 182–183.5° C.
I.R. (in CHCl$_3$): $\gamma_{max}$=2840, 1607, 1570, 1490, 1409, 1122 and 1062 cm.$^{-1}$.

(i) According to the procedures described in Example I(j) and (k), 3-methoxy-14α,17α-ethylidenedioxy-20,20-ethylenedioxy-19-nor-1,3,5(10) - pregnatriene was converted to 14α,17α-ethylidenedioxy-19-nor-progesterone.

Example VIII (a) According to the procedure described in Example VII(a), 11β,14α,17α - trihydroxyprogesterone was converted with propanal to 11β - hydroxy-14α,17α-propylidenedioxyprogesterone.

Melting point: 191–193° C.
I.R. (in CHCl$_3$): $\gamma_{max}$=3620, 1712, 1667, 1619, 1358 and 1130 cm.$^{-1}$.

(b) According to the procedure described in Example VII(c), 11β-hydroxy-14α,17α-propylidenedioxyprogesterone was converted to 11β,hydroxy-14α,17α-propylidenedioxy-1-dehydroprogesterone.

Melting point: 162–165° C.
I.R. (in CHCl$_3$): $\gamma_{max}$=3616, 3092, 1711, 1660, 1620, 1602, 1359 and 1129 cm.$^{-1}$.

(c) According to the procedure described in Example VII(d), 11β - hydroxy-14α,17α-propylidenedioxy-1-dehydroprogesterone was converted to 14α,17α-propylidenedioxy-1,9(11)-bisdehydroprogesterone.

Melting point: 138–139° C.
N.M.R. (in CDCl$_3$): δ=0.77, 0.90 (triplet), 1.41, 2.18, 4.87 (triplet), 5.6 (broad), 6.08, 6.3 and 7.2 (AB-spectrum) p.p.m.

(d) According to the procedure described in Example I(e), 14α,17α - propylidenedioxy-1,9(11)-bisdehydroprogesterone was converted to 3 - hydroxy-14α,17α-propylidenedioxy-19-nor-1,3,5(10),9(11) - pregnatetraene - 20-one.

Melting point: 127–135° C.
N.M.R. (in CDCl$_3$): δ=0.77, 0.92 (triplet), 2.23, 4.94 (triplet), 6.18 (broad), 6.57, 6.6 and 7.5 (AB-spectrum) p.p.m.

(e) According to the procedure described in Example I(h), 3-hydroxy - 14α,17α - propylidenedioxy-19-nor-1,3,5(10)9,(11) - pregnatetraene-20-one was converted to 3-methoxy - 14α,17α - propylidenedioxy-19-nor-1,3,5(10), 9(11)-pregnatetraene-20-one.

Melting point: 122.5–123.5° C.
N.M.R. (in CDCl$_3$): δ=0.79, 0.93 (triplet), 2.22, 3.80, 4.95 (triplet), 6.62, 6.23 (broad), 6.7 and 7.6 (AB-spectrum) p.p.m.

(f) According to the procedure described in Example I(i), 3 - methoxy-14α,17α-propylidenedioxy-19-nor-1,3,5-(10),9(11)-pregnatetraene-20-one was converted to 3-methoxy-14α,17α-propylidenedioxy - 20,20 - ethylenedioxy-19-nor-1,3,5(10),9(11)-pregnatetraene.

Melting point: 123–127° C.
I.R. (in CHCl$_3$): $\gamma_{max}$=1630, 1605, 1562, 1490, 1160 and 1143 cm.$^{-1}$.

(g) According to the procedure described in Example VII(h), 3-methoxy-14α,17α-propylidenedioxy - 20,20-ethylenedioxy-19-nor-1,3,5(10),9(11) - pregnatetraene was converted to 3-methoxy-14α,17α-propylidenedioxy-20,20-ethylenedioxy-19-nor-1,3,5(10)-pregnatriene.

Melting point: 96–99° C.
N.M.R. (in CDCl$_3$): δ=0.95 (triplet), 1.00, 1.33, 3.78, 3.95, 5.00, 6.65, 6.8 and 7.2 (AB-spectrum) p.p.m.

(h) According to the procedure described in Example I(j), 3-methoxy - 14α,17α - propylidenedioxy-20,20-ethylenedioxy-19-nor - 1,3,5(10) - pregnatriene was converted to 3-methoxy-14α,17α-propylidenedioxy - 20,20-ethylenedioxy-19-nor-2,5(10)-pregnadiene.

I.R. (in CHCl$_3$) $\gamma_{max}$=1697, 1663, 1370, 1163 and 1061 cm.$^{-1}$.
Molecular ion peak in mass spectrum: Calculated for $C_{26}H_{35}O_5$:430; found: 430.

(i) According to the procedure described in Example I(k), 3-methoxy - 14α,17α - propylidenedioxy-20,20-ethylenedioxy-19-nor-2,5(10)-pregnadiene was converted to 14α,17α-propylidenedioxy-19-nor-progesterone.

Melting point: 100–102° C.
λ$_{max}$ (in methanol) = 240 nm.;

$$E^{1\%}_{1cm.} = 470.$$

I.R. (in CHCl$_3$): γ$_{max}$=1709, 1660, 1615, 1356 and 1105 cm.$^{-1}$.
N.M.R. (in CDCl$_3$): δ=0.87, 0.96 (triplet), 2.18, 4.94 (triplet), and 5.87 p.p.m.
Molecular ion peak in mass spectrum: Calculated for C$_{23}$H$_{32}$O$_4$: 372; found: 372.

Example IX (a) According to the procedure described in Example VII(c), 14α,17α-ethylidenedioxyprogesterone (prepared according to the procedure described in Example VII(a) is converted to 14α,17α-ethylidenedioxy-1-dehydroprogesterone.

Melting point: 212.5–215° C.
I.R. (in CHCl$_3$): γ$_{max}$=1710, 1662, 1620, 1602, 1358 and 1113 cm.$^{-1}$.

(b) According to the procedure described in Example I(i), 14α,17α-ethylidenedioxy - 1 - dehydroprogesterone was converted to 14α,17α-ethylidenedioxy - 20,20 - ethylenedioxy-1,4-pregnadiene-3-one.

Melting point: 200.5–205.5° C.
I.R. (in CHCl$_3$): γ$_{max}$=1658, 1618, 1408, 1120 and 1060 cm.$^{-1}$.

(c) To a refluxing, stirred, green colored mixture of 1.5 g. of naphthalene, 0.14 g. of lithium and 11 ml. of tetrahydrofurane in a nitrogen atmosphere, a solution of 1.2 g. of 14α,17α-ethylidenedioxy-20,20-ethylenedioxy-1,4-pregnadiene-3-one in 6 ml. of tetrahydrofurane was added slowly. Ten minutes after the addition was completed, subsequently were added 4 ml. of methanol, 6 ml. of water and 3 ml. of concentrated hydrochloric acid and the reaction mixture was stirred for another 3 hours at 55° C. The naphthalene was removed by steam distillation and the hot residue was extracted with chloroform. The extract was washed with water, concentrated to dryness and the residue crystallized from methanol. Yield: 0.40 g. of 3-hydroxy-14α,17α-ethylidenedioxy - 20,20 - ethylenedioxy-19-nor-1,3,5(10)-pregnatriene.

Melting point: 246–251° C.
N.M.R. (in CDCl$_3$): γ$_{max}$=1.00, 1.33, 1.34 (doublet), 4.00, 5.24 (quadruplet), 6.58, 6.6 and 7.1 (AB-spectrum) p.p.m.

(d) According to the procedure described in Example I(h), 3-hydroxy-14α,17α-ethylidenedioxy - 20,20 - ethylenedioxy-19-nor-1,3,5(10) - pregnatriene was converted to 3-methoxy-14α,17α-ethylidenedioxy - 20,20 - ethyliene-dioxy-19-nor-1,3,5(10)-pregnatriene. The preparation of this compound was described also in Example I(i).

(e) According to the procedures described in Example I(j) and (k), 3-methoxy-14α,17α-ethylidenedioxy-20,20-ethylenedioxy-19-nor - 1,3,5(10) - pregnatriene was converted to 14α,17α-ethylidenedioxy-19-nor-progesterone.

Example X (a) According to the procedure described in Example I(f), 3-hydroxy - 14α,17α - ethylidenedioxy-19-nor-1,3,5-(10),9(11)-pregnatetraene - 20 - one (prepared according to the procedure described in Example VII(e)) was converted to 3-hydroxy-14α,17α-ethylidenedioxy-19-nor-9β-1,3,5(10)-pregnatriene-20-one. The preparation of this compound was also described in Example II(a).

(b) According to the procedures described in Example II(b–e), 3-hydroxy - 14α,17α - ethylidenedioxy-19-nor-9β-1,3,5(10)-pregnatriene-20-one was converted to 14α,17α-ethylidenedioxy-19-nor-9β,10ξ-progesterone.

The invention includes within its scope pharmaceutical preparations containing, as the active ingredient, at least one of the therapeutically active compounds of the general formula as shown in FIG. 1 in association with a pharmaceutically acceptable carrier. The preparations may take any of the forms customarily employed for administration of therapeutically active substances, but the preferred types are those suitable for oral administration, especially tablets, including sustained release tablets, pills and capsules including the substance and those suitable for parenteral administration. The tablets and pills may be formulated in the usual manner with one or more pharmaceutically acceptable diluents or excipients, and include materials of lubricating nature. Capsules made of absorbable material, such as gelatin, may contain the active substance alone or in admixture, with a solid or liquid diluent. Liquid preparations may be in the form of suspensions, emulsions, syrups or elixirs of the active substance in water or other liquid medium commonly used for making orally acceptable pharmaceutical formulations.

The active substance may also be made up in a form suitable for parenteral administration, i.e. as a suspension or emulsion in sterile water or an organic liquid usually employed for injectable preparations, for example a vegetable oil such as corn or olive oil, or a sterile solution in water or an organic solvent.

When used for human contraceptive purposes the compounds may be administered orally in daily dosages such as tablets of 1.5 to 7.5 mg. the compounds may also be administered parenterally, subcutaneously or intramuscularly in the form of a depot preparation containing from 150 to 250 mg. of active substance as a crystal suspension in water or dissolved in a very pure oil such as corn oil. The depot form will give protection against conception for 2 to 3 months. In combating threatened abortus or dysmenorrhoea the daily dosage range from 1–5 mg. given orally or parenterally.

What we claim and desire to secure by Letters Patent is:

1. 3 - alkoxy - 14α,17α-methylenedioxy-20,20-ethylenedioxy-19-nor-2,5(10)-pregnadiene of the formula

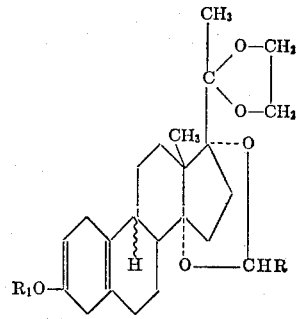

wherein R represents a straight or branched chain aliphatic hydrocarbon group having less than 6 carbon atoms or a phenyl group, and R$_1$ represents a lower alkyl group having less than 5 carbon atoms.

2. A 3 - alkoxy - 14α,17α-methylenedioxy-20,20-ethylenedioxy-19-nor-2,5(10)-pregnadiene as claimed in claim 1 which is 3 - methoxy - 14α,17α - ethylidene-dioxy-20,20-ethylenedioxy-19-nor-2,5(10)-pregnadiene.

3. A 3-alkoxy-14α,17α-methylenedioxy-20,20-ethylenedioxy-19-nor-2,5(10)-pregnadiene as claimed in claim 1, which is 3-methoxy-14α,17α-ethylidenedioxy-20,20-ethylenedioxy-19-nor-9β-2,5(10)-pregnadiene.

4. A 3-alkoxy-14α,17α-methylenedioxy-20,20-ethylenedioxy-19-nor-2,5(10)-pregnadiene as claimed in claim 1, which is 3-methoxy-14α,17α-hexylidenedioxy-20,20-ethylenedioxy-19-nor-2,5(10)-pregnadiene.

5. A 3-alkoxy-14α,17α-methylenedioxy-20,20-ethylenedioxy-19-nor-2,5(10)-pregnadiene as claimed in claim 1, which is 3 - methoxy - 14α,17α-(2,2-dimethyl-propylidene-dioxy)-20,20-ethylenedioxy-19-nor-2,5(10)-pregnadiene.

6. A 3-alkoxy-14α,17α-methylenedioxy-20,20-ethylenedioxy-19-nor-2,5(10)-pregnadiene as claimed in claim 1, which is 3 - methoxy - 14α,17α-(2-ethylbutylidenedioxy)- 20,20-ethylenedioxy-19-nor-2,5(10)-pregnadiene.

7. A 3-alkoxy-14α,17α-methylenedioxy-20,20-ethylenedioxy-19-nor-2,5(10)-pregnadiene derivative as claimed in claim 1, which is 3-methoxy-14α,17α-propylidenedioxy-20,20-ethylenedioxy-19-nor-2,5(10)-pregnadiene.

8. A 3-alkoxy-14α,17α-methylenedioxy-20,20-ethylenedioxy-19-nor-1,3,5(10)-pregnatriene of the formula:

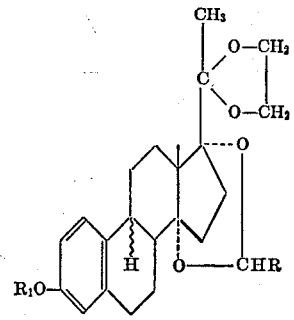

wherein R represents a straight or branched chain aliphatic hydrocarbon group having less than 6 carbon atoms or a phenyl group, and $R_1$ represents a lower alkyl group having less than 5 carbon atoms.

9. A 3-alkoxy-14α,17α-methylenedioxy-20,20-ethylenedioxy-19-nor-1,3,5(10)-pregnatriene derivative as claimed in claim 8, in which said derivative is 3-methoxy-14α,17α-benzylidenedioxy - 20,20-ethylenedioxy-19-nor-1,3,5(10)-pregnatriene.

10. A 14α,17α,methylenedioxy - 19 - nor progresterone derivative of the formula

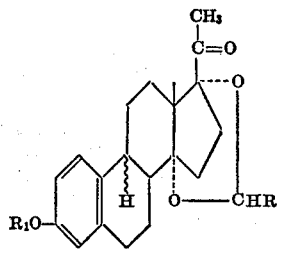

when R represents a straight or branched chain aliphatic hydrocarbon having less than 6 carbon atoms or a phenyl group and $R_1$ represents hydrogen or a lower alkyl group having less than 5 carbon atoms.

11. A 3 - hydroxy-14α,17α-methylenedioxy-19-nor-1,3,5(10)-pregnatriene-20-one derivative of the formula

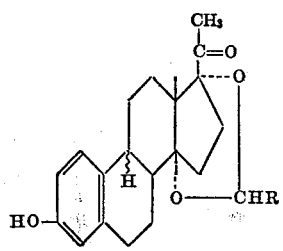

wherein R represents a straight or branched chain aliphatic hydrocarbon group having less than 6 carbon atoms or a phenyl group.

12. A 3 - alkoxy - 14α,17α - methylenedioxy-19-nor-1,3,5(10),9(11)-pregnatetraen-20-one derivative of the formula:

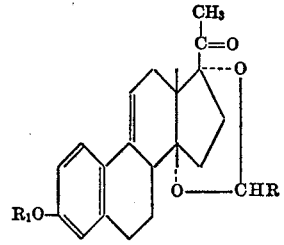

wherein R represents a straight or branched chain aliphatic hydrocarbon group having less than 6 carbon atoms or a phenyl group, and $R_1$ represents a lower alkyl group having less than 5 carbon atoms.

13. A 14α,17α - methylenedioxy - 20,20-ethylenedioxy-1,4-pregnadiene-3-one derivative of the formula:

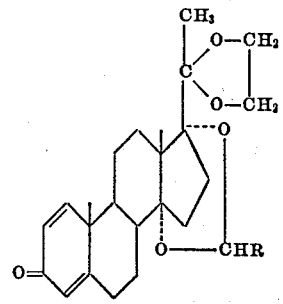

wherein R represents a straight or branched chain aliphatic hydrocarbon group having less than 6 carbon atoms or a phenyl group.

14. A 14α-17α-methylenedioxy-1,9(11)-bisdehydroprogesterone derivative of formula

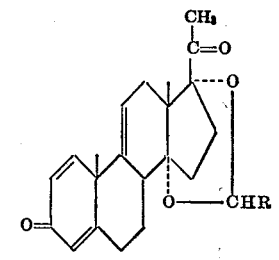

wherein R represents a straight or branched chain aliphatic hydrocarbon group having less than 6 carbon atoms or a phenyl group.

15. A process for preparing a 14α,17α-methylenedioxy-19-nor-progesterone derivative of the formula:

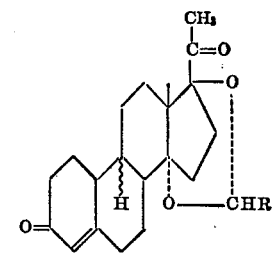

(1)

wherein R represents a phenyl group or a straight or branched chain aliphatic hydrocarbon group of less than 6 carbon atoms, comprising the steps:
(1) of reacting 3,14α,17α-trihydroxy-19-nor-1,3,5(10)-pregnatrien-20-one or its 9β-isomer with an aldehyde of the formula RCHO, wherein R is as defined above;
(2) protecting the 3-hydroxyl group of the thus obtained 14α,17α-methylenedioxy derivative of the formula:

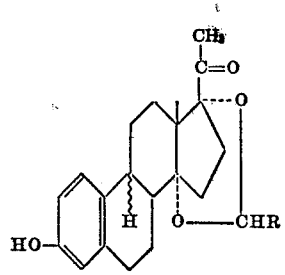

(2)

by etherification with a dialkylsulphate of the formula $(R_1)_2SO_4$, wherein $R_1$ represents a lower alkyl group having less than 5 carbon atoms;

(3) protecting the 20-keto group of the thus obtained 3-alkoxy derivative of the formula:

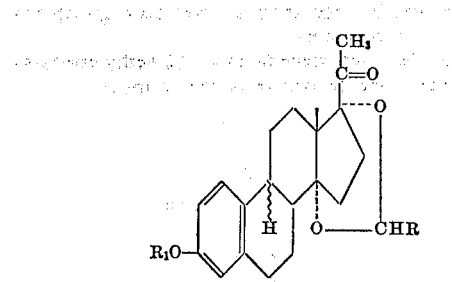

(3)

by converting it with ethylene glycol to a 20,20-ethylene group;
(4) reducing the thus obtained 20,20-ethylenedioxy compound of the formula:

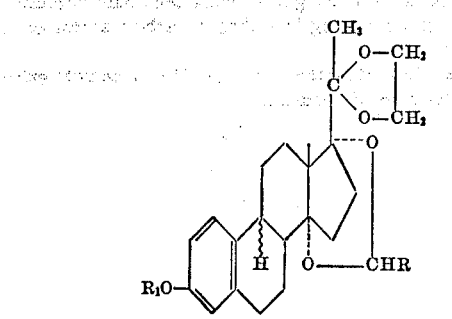

(4)

with sodium and liquid ammonia;
(5) and converting the thus obtained 2,5(10)-pregnadiene derivative of the formula:

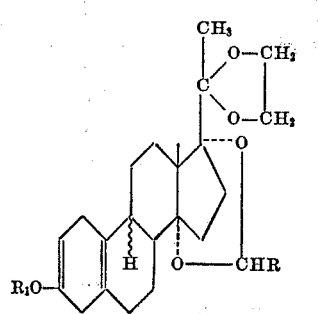

(5)

by refluxing it in a solution of an organic solvent in the presence of a strong acid into a 14α,17α-methylenedioxy-19-nor-progesterone derivative of formula (1).

16. A process of preparing a 14α,17α-methylenedioxy-19-nor-progesterone derivative of the formula:

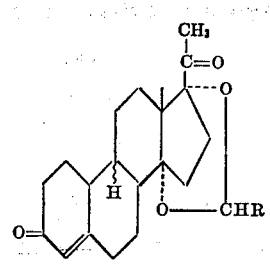

(1)

wherein R represents a phenyl group or a straight or branched chain aliphatic hydrocarbon group of less than 6 carbon atoms, comprising the steps:

(1) of microbiologically hydroxylating in the 11-position a 14α,17α-methylenedioxy-pregesterone derivative of the formula:

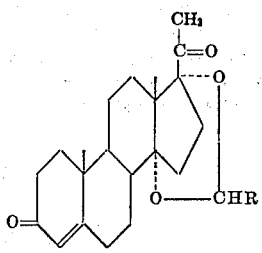

(6)

wherein R is as defined above;
(2) dehydrating in the 9(11)-position the thus obtained 11-hydroxy-14α,17α-methylenedioxy - progesterone derivative;
(3) dehydrogenating in the 1,2-position the thus obtained 9(11)-dehydroprogesterone derivative;
(4) subjecting the thus obtained 1,9(11)-bisdihydroprogesterone derivative of the formula:

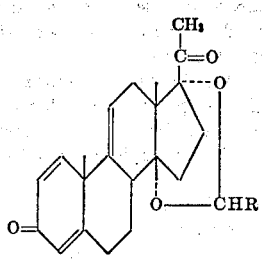

(7)

to aromatization and protecting the 3-hydroxyl group of the thus obtained 3-hydroxy-19-nor-1,3,5(10),9(11)-pregnatetraen-20-one compound by etherification with a dialkylsulphate of the formula $(R_1)_2SO_4$, wherein $R_1$ is a lower alkyl group having less than 5 carbon atoms;
(5) protecting the 20-keto group of thus obtained 3-alkoxy-14α,17α-methylenedioxy - 19 - nor - 1,3,5(10),9(11)-pregnatetraen-20-one of the formula:

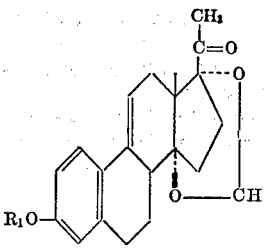

(8)

by converting it with ethylene glycol to a 20,20-ethylenedioxy group;
(6) reducing the 9(11)-double bond of the thus obtained 20,20 - ethylenedioxy-19-nor - 1,3,5(10),9(11)-pregnatetraene, and
(7) reducing the thus obtained 20,20-ethylenedioxy compound of the formula:

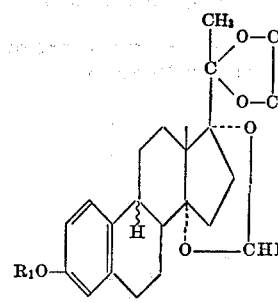

(4)

with sodium and liquid ammonia;

(8) and converting the thus obtained 2,5(10)-pregnadiene derivative of the formula:

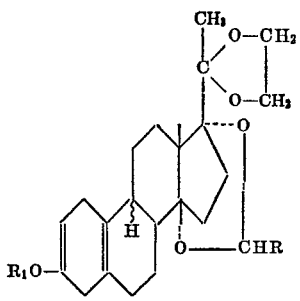

(5)

by refluxing it in a solution of an organic solvent in the presence of a strong acid into a 14α,17α-methylenedioxy-19-nor-progesterone derivative of formula (1).

17. A process of preparing a 14α,17α-methylenedioxy-19-nor-progesterone derivative of the formula:

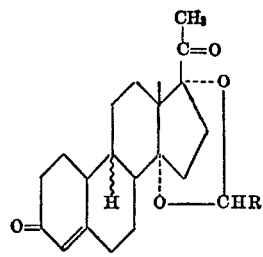

(1)

wherein R represents a phenyl group or a straight or branched chain aliphatic hydrocarbon group of less than 6 carbon atoms, comprising the steps:

(1) dehydrogenating in the 1,2-position a 14α,17α-methylenedioxyprogesterone derivative of the formula:

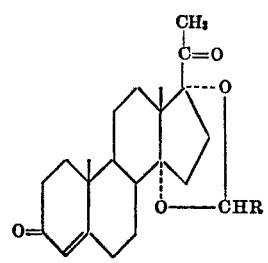

(6)

(2) protecting the 20-keto group of thus obtained 1-dehydro-derivative by converting it with ethylene glycol to a 20,20-ethylenedioxy group;

(3) subjecting the thus obtained 14α,17α-methylenedioxy-20,20-ethylenedioxy-1,4-pregnadiene of the formula:

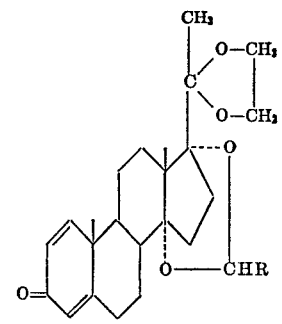

(9)

to aromatization with lithium,
(4) reducing the thus obtained 20,20-ethylenedioxy compound of the formula:

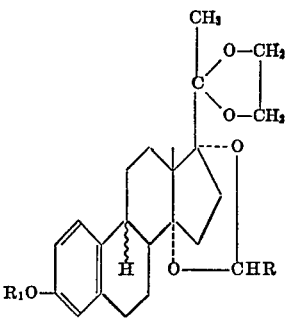

(4)

wherein $R_1$ represents a hydrogen atom, with sodium and liquid ammonia;

(5) and converting the thus obtained 2,5(10)-pregnadiene derivative of the formula:

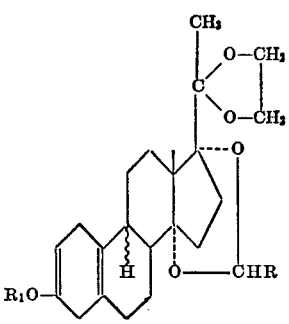

(5)

by refluxing it in a solution of an organic solvent in the presence of a strong acid into a 14α,17α-methylenedioxy-19-nor-progesterone derivative of formula (1).

References Cited
UNITED STATES PATENTS
3,560,486  2/1971  Marx et al. _____ 260—239.55
OTHER REFERENCES
Djcrassi: Steroid Reactions, p. 269.

LEWIS GOTTS, Primary Examiner
F. G. LOVE, Assistant Examiner

U.S. Cl. X.R.
195—51; 260—239.55 D, 397.45; 424—241